Figure 4:
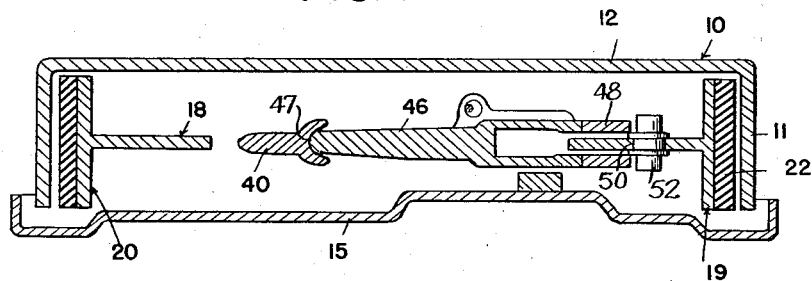
Figure 5:
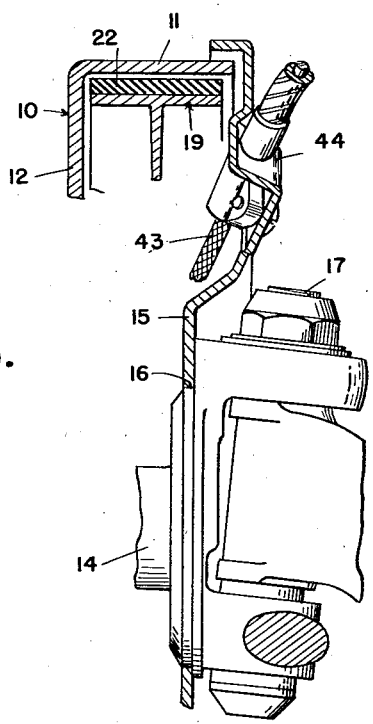

May 28, 1940. C. F. BAISCH 2,202,642
BRAKE MECHANISM
Filed Sept. 27, 1937 3 Sheets-Sheet 1
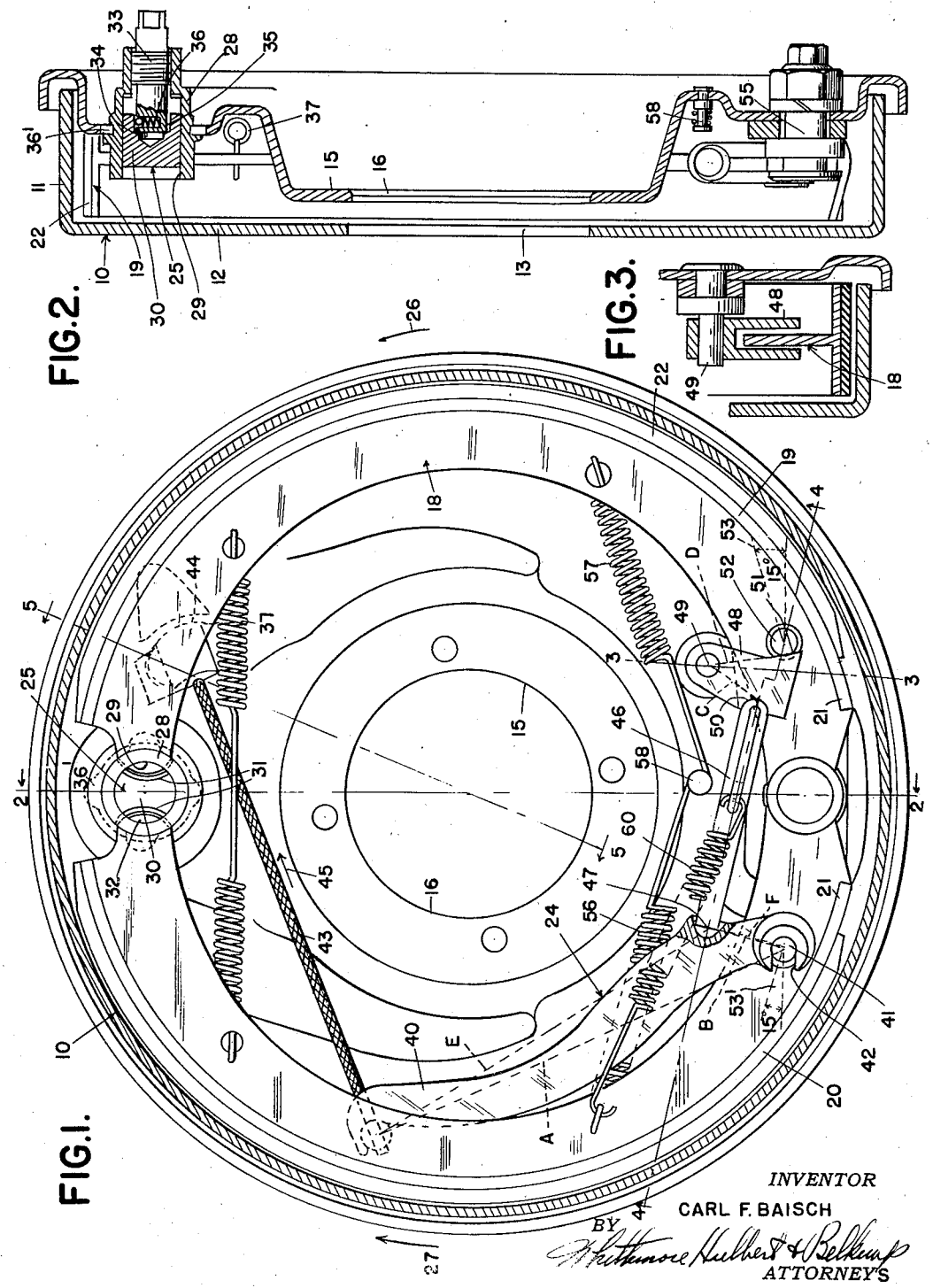

May 28, 1940.  C. F. BAISCH  2,202,642
BRAKE MECHANISM
Filed Sept. 27, 1937   3 Sheets-Sheet 2

INVENTOR
CARL F. BAISCH
ATTORNEYS

May 28, 1940.  C. F. BAISCH  2,202,642
BRAKE MECHANISM
Filed Sept. 27, 1937   3 Sheets-Sheet 3

INVENTOR
CARL F. BAISCH
ATTORNEYS

Patented May 28, 1940

2,202,642

UNITED STATES PATENT OFFICE 2,202,642

BRAKE MECHANISM

Carl F. Baisch, Detroit, Mich., assignor to Kelsey-Hayes Wheel Company, Detroit, Mich., a corporation of Delaware Application September 27, 1937, Serial No. 165,998

7 Claims. (Cl. 188—78)

This invention relates generally to brake mechanisms and refers more particularly to actuators for vehicle wheel brakes.

It is one of the principal objects of the present invention to provide a vehicle wheel brake having improved actuating means so constructed that the braking action is smooth and fully controllable in both directions of rotation of the wheel.

Another advantageous feature of this invention consists in providing the above results in a brake having a link and lever type of actuator by incorporating means in the actuator rendering it possible to apply an operating force on the adjacent ends of the shoes at such an angle that both shoes are, in effect, lifted or moved by the actuator into engagement with the drum in a direction toward the opposite or anchor ends of the shoes.

Another object of this invention resides in the provision of a link and lever type of actuator wherein the means referred to above offers the possibility of providing the same actuating leverage in both directions of rotation, irrespective of whether the brake is the symmetrical type, or the type affording torque in both directions.

Still another advantageous feature of the present invention resides in the provision of an actuator of the character set forth above wherein the means referred to in the preceding paragraph also renders it possible to secure a greater actuating leverage in reverse than is applied in the forward direction of rotation. This arrangement permits the actuator to be advantageously used in a brake of the type having torque in the forward direction only. The result of providing increased leverage in the reverse direction of rotation of a brake of the above type is that the reduction of internal leverage in the forward direction conserves the pedal pressure without making the operation of the brake too hard, and the increased leverage in the reverse direction of rotation provides for reducing the pedal pressure required to decelerate the vehicle when the latter is backing up.

A further object of this invention resides in the provision of brake actuating mechanism of the foregoing type rendering it possible to secure a greater internal leverage when the brake drum is rotating in the forward direction than when the latter is revolving in the reverse direction. This construction is particularly advantageous to take care of the conditions which arise when a number of different gross weight bodies are to be used on a single chassis assembly, or when it is desired to use the same brake on two or more chassis of different weights.

In addition to the foregoing, the present invention contemplates securing the above results in a relatively simple manner and without appreciably modifying accepted brake construction.

Figure 6:
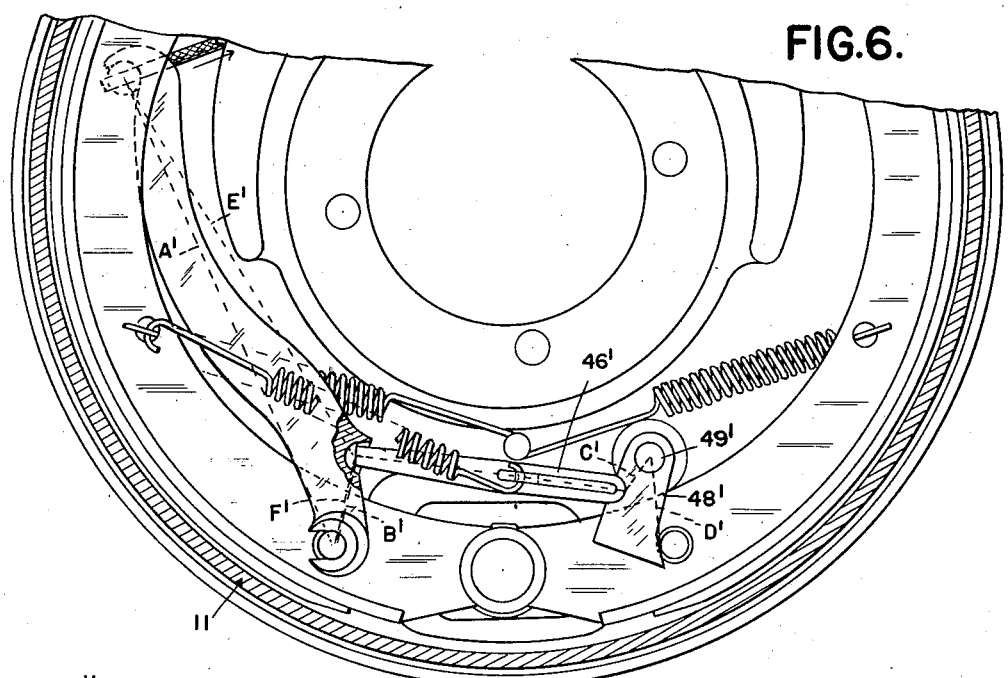
Figure 7:
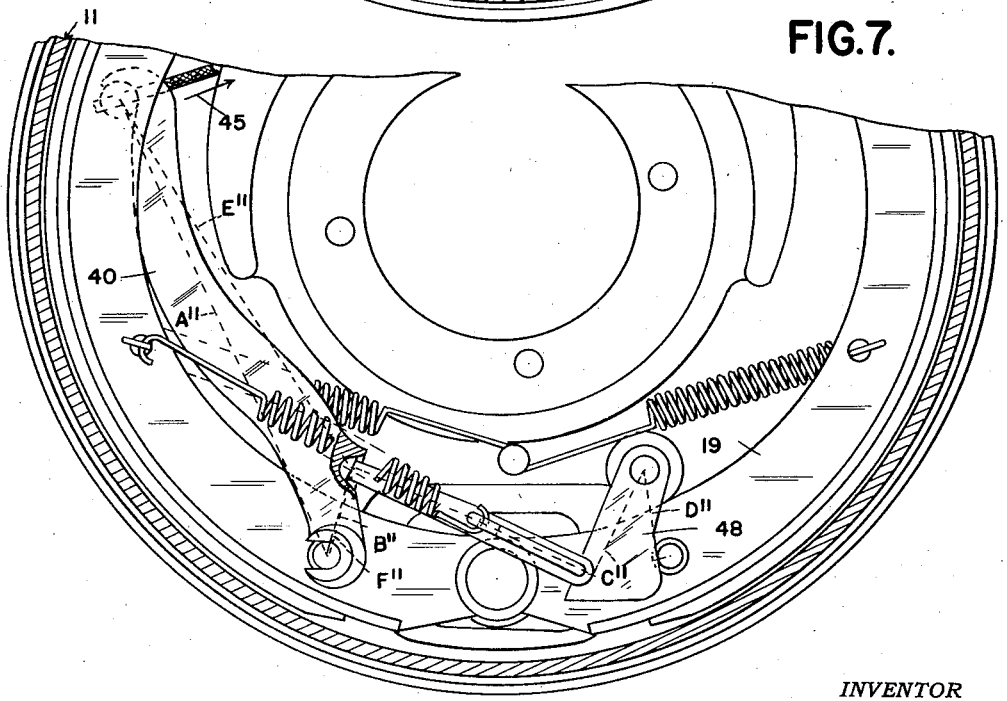

The foregoing, as well as other objects, will be made more apparent as this description proceeds, especially when considered in connection with the accompanying drawings, wherein:

Figure 1 is an elevational view, partly in section, of a brake equipped with actuating mechanism constructed in accordance with this invention;

Figures 2, 3, 4, and 5 are sectional views taken substantially on the planes indicated by the lines 2—2, 3—3, 4—4, and 5—5 of Figure 1;

Figure 6 is a fragmentary elevational view of a slightly modified form of the invention; and Figure 7 is a fragmentary elevational view of still another embodiment of this invention.

The brake selected herein for the purpose of illustrating the present invention is provided with a brake drum 10 having an annular axially extending brake flange 11 and having a web 12 formed with an opening 13 through the central portion thereof for receiving a wheel spindle 14. In accordance with conventional practice, the rear side of the drum is closed by a backing plate 15 having an opening 16 therethrough in alignment with the opening 13 in the web of the brake drum to permit the spindle 14 to extend through the drum, and having a portion surrounding the opening 16 adapted to be secured to the spindle 14. Upon reference to Figure 5, it will be noted that the spindle is connected to the axle of the vehicle by means of a kingpin 17 arranged on an up and down axis extending at an angle to the axis of rotation of the drum which is predetermined to provide for the proper turning of the wheel and associated brake drum about the kingpin.

The backing plate 15 forms a support for the brake mechanism and the latter includes the brake friction means 18 which is shown in Figure 1 as comprising a pair of shoes 19 and 20. Upon reference to Figure 2, it will be noted that the shoes are substantially T-shaped in cross section and are supported on the backing plate 15 within the brake drum with the axially extending portions 21 located adjacent the inner surface of the brake flange 11 on the drum. A brake lining 22 having the desired co-efficient of friction is secured to the outer surfaces of the axially extending portions 21 of the shoes for engagement with the inner annular surface of the brake flange 11 when the shoes are moved radially outwardly relative to the drum.

Referring again to Figure 1, it will be noted that the opposite ends of the shoes are spaced from each other circumferentially of the drum and assume positions at the top and bottom sides of the backing plate 15. It will also be observed from Figure 1 that an actuator 24 is associated with the spaced ends of the shoes at the lower side of the backing plate and that an adjustment anchor device 25 is located between the upper ends of the shoes. In the present illustrative embodiment of the invention, both the actuator and the adjustment anchor device permit circumferential shifting movement of the shoes relative to the brake drum in both the forward and reverse directions of rotation of the drum. As a result, when the brake shoes are moved by the actuator 24 into engagement with the drum in the forward direction of rotation of the latter, indicated by the arrow 26 in Figure 1, torque is transferred from the primary shoe 19 to the secondary shoe 20 through the adjustment anchor device 25 and the resulting servo action assists in applying the brake friction means. On the other hand, when the brake friction means is applied in the reverse direction of rotation of the brake drum indicated by the arrow 27 in Figure 1, torque is transferred in the opposite direction from the shoe 20 to the shoe 19 through the adjustment anchor device 25.

The adjustment anchor device 25 is shown in Figures 1 and 2 as having a bracket 28 secured to the backing plate between the upper ends of the brake shoes. The bracket 28 is provided with an axially extending bore 29 adapted to slidably receive an adjustment wedge 30 having diverging grooves 31 in opposite sides thereof for engagement with the upper extremities 32 of the web portions of the shoes. In this connection, it will be noted from Figure 1 that the extremities 32 of the web portions of the shoes extend into the bore 29 of the bracket through slots formed in the opposite side walls of the bracket. The wedge 30 is moved axially of the bore 29 in the bracket to effect outward movement of the shoes relative to the brake flange 11 by means of an adjusting screw 33 threaded intermediate the ends thereof on the rear end of the bracket and having the forward end engaging the adjacent side of the wedge 30. As will be apparent from Figure 2, the rear end of the screw 33 is accessible for manipulation from a point exteriorly of the backing plate 15 and the forward end of the screw extends into a recess 34 in the rear side of the wedge. The side walls of the recess 34 are broached, or otherwise formed, to provide circumferentially spaced axially extending lands or projections 35 cooperating with a spring pressed detent 36 in the screw to not only indicate predetermined increments of adjustment of the wedge, but to also prevent accidental rotation of the screw.

The brake shoes are adjusted with the above construction by threading the screw 33 into the bracket 28 to such an extent that the wedge 30 is moved forwardly the distance required to engage the linings 22 on the brake shoes with the inner surface of the annular brake flange 11 on the drum. The screw 33 is then backed off the required number of increments of adjustment to secure the desired clearance between the brake shoes and brake flange. In this connection, attention is called to the fact that the extremities 32 of the brake shoes are maintained into frictional engagement with the opposite sides of the wedge by means of a retraction spring 37 having the opposite ends respectively connected to the upper ends of the shoes 19 and 20.

It has previously been stated that in the embodiment of the invention illustrated in Figures 1 to 5, inclusive, the adjustment anchor device permits shifting movement of the brake shoes relative to the brake drum in either direction of rotation of the latter. For accomplishing this result, the opening 36' in the backing plate, through which the bracket 28 extends, is formed sufficiently larger than the diameter of the bracket to provide the clearance necessary to secure the said shifting movement. As a result, torque may be transferred in either direction through the adjustment device from one shoe to the other. Attention may also be called to the fact at this time that the opening 36 through the backing plate 15 is of sufficient radial dimension to permit the shoes to shift in an upward direction, or radially outwardly to engage the adjustment ends of the shoes with the brake flange when the actuator is manipulated to apply the brake.

Referring now more in detail to the actuator 24, it will be noted that this actuator is of the link and lever type and is associated with the lower ends of the brake shoes for moving the latter outwardly into engagement with the brake flange 11 of the drum. In Figure 1 of the drawings, I have shown a lever 40 having one end pivotally connected to the web of the shoe 20 at a point adjacent the lower extremity of the shoe by means of a pin 41 secured to the web of the shoe 20 and extending into a slot 42 in the adjacent end of the lever 40. The free or opposite end of the lever 40 is operatively connected to a cable 43 extending through the backing plate 15, as at 44, at a point substantially in alignment with the kingpin axis. This construction is advantageous in that it minimizes angular displacement of the cable during steering of the wheel about the kingpin axis and provides for reducing the length of the cable required to compensate for turning of the wheel.

Any suitable means (not shown) is operatively connected to the cable 43 for pulling the same in the direction of the arrow 45 in Figure 1 and since the cable is connected to the free end of the lever 40, it follows that the latter will be swung about its pivot 41 in a corresponding direction. In the present instance, swinging of the lever 40 about the pivot 41 in the direction of the arrow 45 applies a force to the lower end portions of the shoes in a direction to move the latter outwardly into engagement with the brake flange 11 of the drum. This is accomplished, in the present instance, by means of a link 46 having one end fulcrumed on the lever 40 at a point 47 located adjacent the pivot 41 and having the opposite end operatively connected to the shoe 19 through the medium of a lever 48. The lever 48 is pivoted on the backing plate 15 by means of a pin 49 for swinging movement in a plane parallel to the plane of swinging movement of the lever 40 and the end of the link 46 oppositely the end fulcrumed on the lever 40 extends into a recess 50 formed in the adjacent side of the lever 48 at the swinging end of the latter. The opposite side of the lever 48 is formed with a cam surface 51 for abutting engagement with a pin 52 secured to the web of the brake shoe 19. The cam surface 51 is inclined at such an angle that, upon swinging movement of the lever 48 about the pivot 49, it exerts a force on the pin 52 in the direction of the line 53 or, in other words, tends to lift the shoe 19 and effect engagement of the adjustment end of the shoe with the brake flange 11. The actuating angle represented by the line 53 is preferably the same as the actuating angle 53' for the brake shoe 20 so that both shoes are, in effect, lifted to engage the adjustment ends thereof with the brake flange of the drum.

In the specific illustration of the brake shown in Figures 1 to 5, inclusive, the internal leverage afforded by the actuator is the same in both directions of rotation of the brake drum. In this connection, attention is called to the fact that the distance C between the pivot 49 and the point of engagement of the link 46 with the lever 48 is less than the distance D between the pivot 49 and the point of engagement of the lever 48 with the pin 52 carried by the shoe 19, by an amount predetermined to compensate for the increased leverage afforded by the actuator in the forward direction of rotation and designated in Figure 1 by the lines A and B. In other words, in the specific illustration shown, the leverage arms $$\frac{A}{B} \times \frac{C}{D} = \frac{E}{F}$$

where the arms E and F represent the leverage in the reverse direction of rotation.

Upon reference to Figure 2, it will be noted that an anchor is provided for the actuator ends of the shoes and this anchor is in the form of a stud 55 secured to the backing plate 15 in such a manner as to permit limited radial displacement of the anchor relative to the backing plate and thereby insure proper centering of the brake friction means in the brake drum. The actuator ends of the shoes are yieldably maintained in engagement with the anchor by means of the springs 56 and 57 having their opposite ends respectively connected to the shoes 19 and 20 and having their adjacent ends connected to a pin 58. The pin 58 is secured to the backing plate at a point offset from the plane including the axis of rotation of the drum and the axis of the stud 55 so that the spring 56 exerts a greater force than the spring 57. As a consequence, the primary shoe 19 is moved into engagement with the brake flange 11 in advance of the secondary shoe 20. Attention is called to the fact that in Figure 1, the abutment 58 is shown as spaced below the points of connection of the outer ends of the springs with the shoes so that the latter are normally urged in a direction toward the stud 55. Also, a spring 60 is provided for holding the link 46 in assembled relation with the lever 40. As shown in Figure 1, one end of the spring 60 is secured to the web of the shoe 20 and the other end of the spring is connected to the link 46 intermediate the ends of the latter.

It will be understood from the foregoing that my improved brake actuating mechanism is highly flexible insofar as the particular internal leverage is concerned. For example, in Figure 6, I have shown an arrangement wherein the leverage is less in the forward direction of rotation than in the reverse direction of rotation. The above is accomplished by engaging the end of the link 46' with the lever 48' at a point closer to the pivot 49' so that the lever arm C' is substantially smaller than the lever arm D'. In the embodiment of the invention shown in Figure 6, the lever arm C' is reduced to such an extent that the internal leverage in the reverse direction of rotation exceeds the leverage in the forward direction of rotation. In other words, in Figure 6, the leverage $$\frac{A'}{B'} \times \frac{C'}{D'} < \frac{E'}{F'}$$

The above arrangement is of particular utility for use in brakes having torque in the forward direction only and which are symmetrical in the reverse direction of rotation. The reduction of internal leverage in the forward direction of rotation will conserve the pedal pressure without making this pressure too hard and the increased pressure in the reverse direction will reduce the pedal pressure required to stop the vehicle when the latter is backing up.

In some cases, it may be desirable to provide a greater leverage in the forward direction of rotation of the brake drum than in the reverse direction and with this in view, attention is called to the embodiment of the invention illustrated in Figure 7. This construction differs from the foregoing in that the lever arm C'' is substantially longer than the lever arm D''. It follows, therefore, that the auxiliary lever 48 functions to provide additional leverage in favor of the shoe 19 when the lever 40 is swung in the direction of the arrow 45. In other words, the leverage $$\frac{A''}{B''} \times \frac{C''}{D''} > \frac{E''}{F''}$$

The above construction is particularly advantageous to take care of conditions arising when a number of different gross weight bodies are to be used on one chassis assembly, or when it is desired to use the same brake on two or more chassis of different weights. It follows from the above that uniform brake deceleration may be secured under numerous different conditions by merely interchanging the lever 48 to provide the desired leverage.

What I claim as my invention is:

1. In a brake mechanism, a brake drum, brake friction means supported in said drum for movement into engagement with the latter and having spaced ends, an actuator of the link and lever type interconnecting said ends, said actuator comprising a lever having one end pivotally connected to the friction means adjacent one of the ends, a second lever supported for swinging movement adjacent the other of said ends and having an inclined cam surface engaging the latter end, the angle of inclination of the cam surface being predetermined to apply a force component on the latter end of the friction means in a direction extending generally circumferentially of the brake drum, and a link having one end engageable with the first lever at a point spaced a predetermined distance from the pivotal connection of this lever with the brake friction means and having the opposite end engaging the second lever.

2. In brake mechanism, a brake drum, brake friction means supported in said drum for movement into engagement with the latter and having spaced ends, an actuator of the link and lever type interconnecting said ends and comprising, a lever having one end pivotally connected to the brake friction means adjacent one end of the latter, a second lever supported for swinging movement and having a cam surface engageable with the other end portion of the friction means, said surface being inclined at an angle to impart a force component to the latter end of the friction means in a direction extending generally circumferentially of the brake drum, and a link having one end engaging the first lever at a point spaced from the pivotal connection of this lever to the friction means and having the opposite end engaging the second lever, the point of engagement of the link with the second lever being spaced from the axis of swinging movement of the latter lever a distance less than the point of engagement of the second lever with the brake friction means.

3. In brake mechanism, a brake drum, brake friction means supported in said drum for movement into engagement with the latter and having spaced ends, an actuator of the link and lever type interconnecting said ends, said actuator comprising a lever having one end pivotally connected to the friction means adjacent one of said ends, a link engaging the lever at a point spaced from the pivotal connection of the lever with the friction means and extending toward the other of the said ends of the friction means, an abutment on the latter end of the friction means, and a lever supported for swinging movement and having the swinging end thereof located between the link and abutment and effective to apply a force to the second named end of the friction means from the first named lever in a direction predetermined to move said second end relative to the drum in a direction toward the portion of the friction means located opposite the ends aforesaid thereof.

4. In brake mechanism, a brake drum, brake friction means supported in said drum for movement into engagement with the latter and having spaced ends, an actuator of the link and lever type interconnecting said ends and comprising, a lever having one end pivotally connected to the friction means adjacent one end thereof, a second lever supported for swinging movement and having an inclined cam surface adjacent the swinging end thereof engaging the other of said ends of the friction means to impart a force on the latter end of the friction means in a direction extending generally circumferentially of the brake drum, a link having one end engaging the first lever at a point spaced radially inwardly from the pivotal connection of this lever with the friction means and having the opposite end engaging the second lever, the distance between the point of engagement of the link with the second lever and the axis of swinging movement of the latter being less than the distance between the axis of swinging movement and the point of engagement of the second lever with the brake friction means.

5. In brake mechanism, a brake drum having a forward direction of rotation, brake friction means including a leading shoe and a trailing shoe supported in said drum for movement into engagement with the latter and having the ends at one side of the drum spaced circumferentially from each other, an actuator of the link and lever type interconnecting said ends of the shoes and comprising, a lever having one end pivotally connected to the trailing shoe adjacent the end aforesaid thereof, a cable directly connected to the opposite end of the lever and extending from the lever in the direction of forward rotation of the drum, a second lever supported for swinging movement and having an inclined cam surface adjacent the swinging end engaging the leading shoe adjacent the end aforesaid thereof, the angle of inclination of the cam surface being predetermined to impart a thrust on the latter end of the leading shoe in a direction toward the opposite end of the leading shoe, and a link having one end engaging the first lever at a point spaced radially inwardly from the pivotal connection of this lever to the trailing shoe and having the opposite end engaging the second lever.

6. In brake mechanism, a brake drum having a forward direction of rotation, brake friction means including a leading shoe and a trailing shoe supported in said drum for movement into engagement with the latter and having the ends at one side of the drum spaced circumferentially from each other, an actuator of the link and lever type interconnecting said ends of the shoes and comprising, a lever having one end pivotally connected to the trailing shoe adjacent the end aforesaid thereof and having the other end operatively connected to an operating member, a second lever supported for swinging movement and having an inclined cam surface adjacent the swinging end engaging the leading shoe adjacent the end aforesaid thereof to impart a thrust on said shoe in a direction toward the opposite end of the latter shoe, and a link having one end engaging the first lever at a point spaced radially inwardly from the pivotal connection of this lever to the trailing shoe and having the opposite end engaging the second lever, the distance between the point of engagement of the link with the second lever and the axis of swinging movement of the latter being less than the distance between the axis of swinging movement and the point of engagement of the second lever with the leading shoe.

7. In brake mechanism, a brake drum having a forward direction of rotation, brake friction means including a leading shoe and a trailing shoe supported in said drum for movement into engagement with the latter and having the ends at one side of the drum spaced circumferentially from each other, an actuator of the link and lever type interconnecting said ends of the shoes and comprising, a lever having one end pivotally connected to the trailing shoe adjacent the end aforesaid thereof and having the other end operatively connected to an operating member, a second lever supported for swinging movement and having a portion adjacent the swinging end engaging the leading shoe adjacent the end aforesaid thereof, and a link having one end engaging the first lever at a point spaced radially inwardly from the pivotal connection of this lever to the trailing shoe and having the opposite end engaging the second lever, the distance between the point of engagement of the link with the second lever and the axis of swinging movement of the latter lever being greater than the distance between the axis of swinging movement of the second lever and the point of engagement of this lever with the leading shoe by an amount predetermined to provide for applying a greater leverage on the leading shoe than is applied to the trailing shoe.

CARL F. BAISCH.